May 29, 1956
F. W. GOODWIN
2,747,567
PORTABLE BRAZIER
Filed Jan. 19, 1953
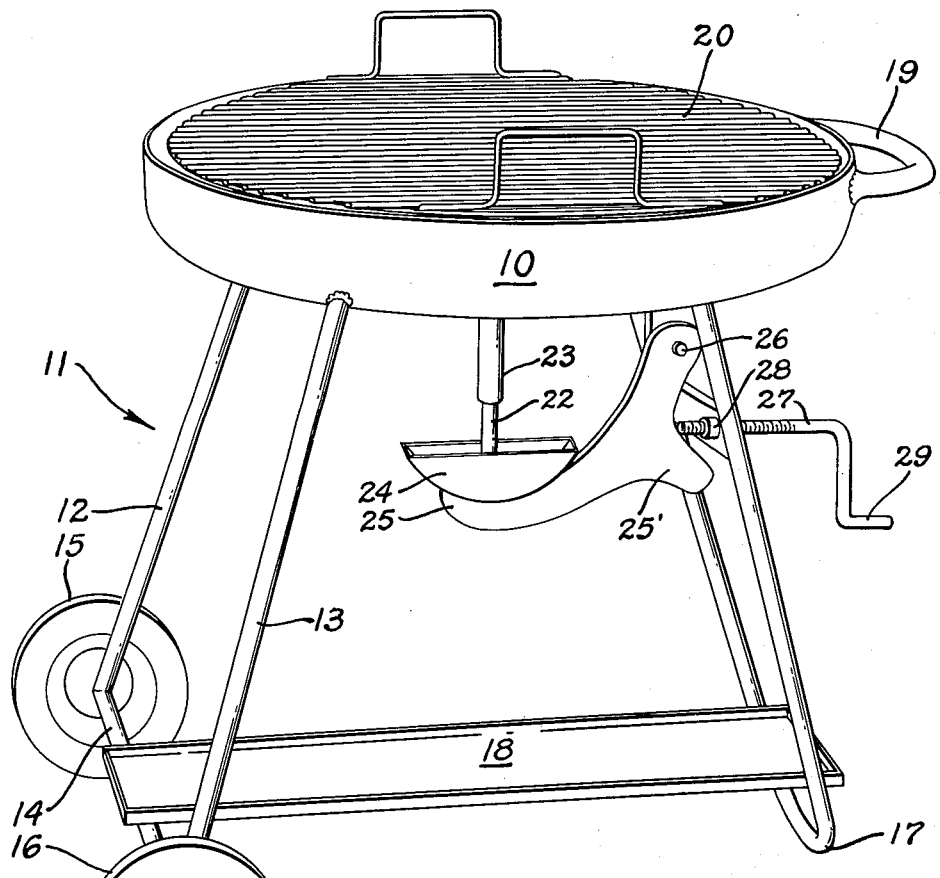
Fig_1
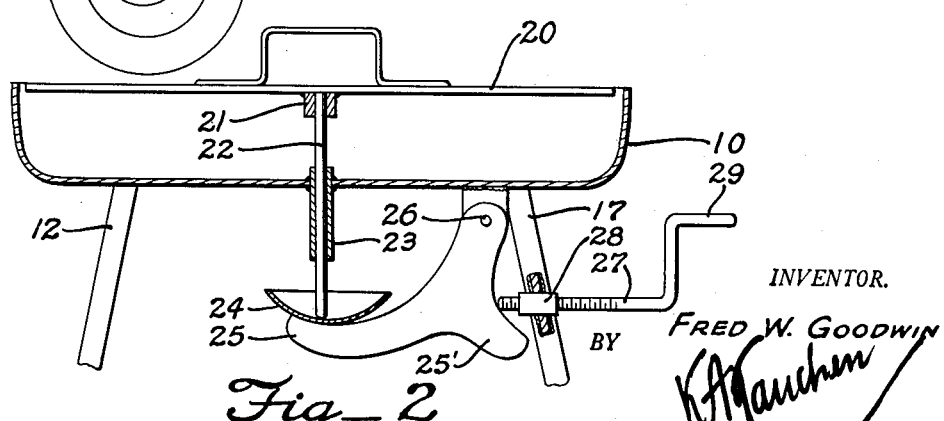
Fig_2
INVENTOR.
FRED W. GOODWIN
BY
PATENT AGENT

# United States Patent Office 2,747,567
Patented May 29, 1956

2,747,567
PORTABLE BRAZIER
Fred W. Goodwin, Berkeley, Calif.

Application January 19, 1953, Serial No. 332,043

3 Claims. (Cl. 126—25)

The present invention relates to cooking apparatus and more particularly to the portable brazier units employed in the outdoor broiling and barbecuing of meats.

As the trend in outdoor living has accelerated, many families have come to own portable brazier units so that they might enjoy broiled or barbecued dinners on their patios or sundecks. However, the full enjoyment of outdoor cooking has been hindered by the lack of complete cleanliness in the use of presently available brazier units; grease from the cooking meat and also soot have dropped through an opening which is provided in the brazier to enable the support of the grill above the burning coals upon the upwardly projecting element of an adjustable grill-supporting arrangement disposed principally and conveniently beneath the brazier. Having dropped through the opening, the grease and soot then fall onto the patio tile or the floor of the sundeck to permanently discolor or otherwise harm the surface.

Accordingly, it is an object of the present invention to provide an improved portable brazier unit arranged to preclude the dripping of grease or soot onto the supporting surface.

More particularly, an object of the invention is to provide an improved portable brazier unit incorporating means for catching grease or soot which falls from the brazier of the unit through the mentioned opening.

Other objects will become apparent from the following description of a preferred embodiment of the invention as shown in the accompanying drawing wherein:

Figure 1 is a perspective view of a portable brazier unit which embodies the present invention.

Figure 2 is a central sectional view of a portion of the unit.

As shown in the drawing, the portable brazier unit includes a brazier in the form of a shallow, broad bowl 10 which is supported substantially in an upright position at a convenient height upon a tripodal undercarriage, generally indicated by the numeral 11. Two legs 12, 13 of the undercarriage are secured to the underside of the bowl 10 in spaced relation so as to extend angularly downwards for connection to an axle 14 adjacent to the opposite ends thereof where rubber-tired wheels 15 and 16 are rotatably mounted. The third leg 17 is formed by a V-shaped bar whose extremities are welded to the underside of the bowl 10. Intermediate points of the V-shaped bar are braced to the axle 14 by a horizontally disposed tray 18 and the somewhat rounded apex of the bar rests directly upon the supporting surface so as to restrain accidental movement of the brazier unit on that surface even if it be slightly inclined. A handle 19 extending laterally from the bowl 10 above this third leg 17 of the undercarriage 11 enables the whole unit to be slightly tilted and then rolled on the wheels 15 and 16 much in the fashion of a wheelbarrow when transportation of the brazier and its contents is desired.

A metal grill 20 of circular configuration is supported for vertical adjustment above the open upper end of the bowl 10 so that meat resting upon the grill will be spaced from the charcoal or other fuel at the correct broiling height. To provide the adjustable support, a cylindrical socket member 21 is secured to the grill 20 at its center to extend at a right angle therefrom and telescope over the upper end of a bar 22 which passes loosely through a tube 23 extending centrally through the bottom of the bowl 10, as shown in Figure 2. In accordance with the present invention, the lower end of the bar 22 rests in a curved trough or receptacle 24 which is rigidly secured as by welding adjacent one end of a lever 25 pivoted at its other end on a horizontally-disposed pin 26 suspended from the underside of the bowl 10. A shoulder 25' formed on the lever 25 intermediate its ends abuts the end of a screw 27 which passes through a horizontal threaded bore in a block 28 that is also suspended from the bowl. The far end of the screw 27 is bent to form a crank 29 so that the screw can be conveniently rotated to cause the lever 25 to move around its pivot 26. As the lever moves, the trough 24 secured thereon is displaced in an arcuate path to exert a camming action on the bar 22 resting therein and shift the same vertically to thereby adjust the position of the grill 20 supported thereon. However since the bar 22 is free only to move vertically, its relative position within the trough 24 is shifted horizontally during the arcuate displacement of the latter. Therefore the curvature of the trough 24 is of a degree, as generally determined by the length of the lever 25, such that no binding or hindrance to the relative horizontal displacement of the bar 22 within the trough 24 will be encountered.

In addition to the described construction of the trough 24 so that it might best carry out its camming action on the bar 22, it is also arranged in accordance with the present invention to function simultaneously as a receptacle for grease and soot which eventually pass downwardly between the tube 23 and the bar 22 loosely and slidably extending therethrough. For this purpose, the trough 24 is extended in its curved length and its sides are in semicircular form so that the trough, in effect, has the conformation of a cup whose sides have been displaced inwardly at opposite points. The depth of this trough is sufficient to normally preclude the overflow of accumulated grease even when the brazier unit is tilted in the previously described manner so that it may be rolled to another location. In addition, the capacity of the trough is such that it need be emptied only at infrequent intervals.

If, however, grease accidentally overflows the trough 24 at any time, it will fall not onto the supporting surface but rather onto the tray 18 which as previously explained acts as a structural brace between the third leg 17 and the axle 14.

It will be obvious that by the employment of the trough 24 and the tray 18, the possibility of grease and soot reaching the patio tile or deck floor is practically rendered nonexistent, and that this feature is provided in the portable brazier unit of the present invention without interference with the other functions of each of these parts, as described.

Certain modifications and variations in structure can readily be made without departing from the spirit of the present invention. Therefore, I do not wish to be limited by the foregoing description of a preferred embodiment of the invention, but give reference instead to the appended claims deemed commensurate with the true scope of the invention.

I claim:

1. A brazier unit comprising a bowl supported in a generally upright position and having a central aperture in the bottom thereof, a lever supported beneath said bowl for pivotal movement in substantially a vertical plane, a receptacle rigidly supported on said lever under the aperture in the bottom of said bowl, a bar resting endwise in said receptacle and extending loosely through the aperture in said bowl, a grill seated on said bar above said bowl, said receptacle being effective to collect grease flowing from said grill downwardly along said bar through the aperture in said bowl and means for effecting pivotal movement of said lever to cause said receptacle to act as a cam effective to shift the vertical position of said bar and said grill seated thereon.

2. A brazier unit according to claim 1 wherein said receptacle comprises a longitudinally-curved trough having semicircular sides mounted so that those sides lie substantially in parallelism with the defined vertical plane.

3. A brazier unit comprising a bowl supported in a generally upright position and having an aperture in the bottom thereof, a substantially vertically disposed bar extending loosely through the aperture in said bowl, a grill mounted upon the upper end of said bar above said bowl, a receptacle surrounding the lower end of said bar to collect grease flowing from said grill downwardly along said bar through the aperture in said bowl, and means for supporting said receptacle and operable to cause said receptacle to act as a cam upon said bar for vertical sliding adjustment thereof through the aperture in said bowl.

References Cited in the file of this patent

UNITED STATES PATENTS

| Number | Name | Date |
|---|---|---|
| D. 116,964 | Robinson | Oct. 3, 1939 |
| 271,214 | Brower | Jan. 30, 1883 |
| 1,178,823 | Schwall | Apr. 11, 1916 |
| 2,365,390 | Burmeister | Dec. 19, 1944 |
| 2,386,815 | Rubenstein | Oct. 16, 1945 |
| 2,517,360 | Singer | Apr. 1, 1950 |
| 2,560,797 | Humphrey | July 17, 1951 |
| 2,575,082 | Wolff | Nov. 13, 1951 |

OTHER REFERENCES

Housewares Review for April 1951, vol. 114, page 65, Portable Brazier adv. by Assoc. Steel Industries, Design Div. Copy 13 E-6.

Hardware Age, May 29, 1941, page 65, Barb-A-Ket Adv. by S. E. Laszlo, Design 81-10(12).